United States Patent
Saletta

(10) Patent No.: US 7,460,185 B2
(45) Date of Patent: Dec. 2, 2008

(54) METHOD AND APPARATUS FOR AUTOMATICALLY CORRECTING IMAGE MISALIGNMENT ARISING IN A REAR-PROJECTION LCD TELEVISION DISPLAY

(75) Inventor: David Saletta, Irwin, PA (US)

(73) Assignees: Sony Corporation, Tokyo (JP); Sony Electronics Inc, Park Ridge, NJ (US)

( * ) Notice: Subject to any disclaimer, the term of this patent is extended or adjusted under 35 U.S.C. 154(b) by 598 days.

(21) Appl. No.: 10/919,741

(22) Filed: Aug. 17, 2004

(65) Prior Publication Data

US 2006/0038927 A1    Feb. 23, 2006

(51) Int. Cl.
  *H04N 3/22* (2006.01)
  *H04N 2/227* (2006.01)

(52) U.S. Cl. .............................. 348/745; 348/806

(58) Field of Classification Search ......... 348/745–747, 348/806, 189, 190; *H04N 3/22, 3/223, 3/227*
See application file for complete search history.

(56) References Cited

U.S. PATENT DOCUMENTS

| | | | |
|---|---|---|---|
| 5,631,751 A | 5/1997 | Kim | 349/5 |
| 6,097,546 A | 8/2000 | Yoshii et al. | 359/649 |
| 6,252,626 B1 * | 6/2001 | Buckley et al. | 348/189 |
| 6,634,756 B1 | 10/2003 | Shimizu | 353/74 |
| 6,637,888 B1 | 10/2003 | Haven | 353/31 |
| 6,671,003 B1 * | 12/2003 | George et al. | 348/745 |
| 7,196,741 B2 * | 3/2007 | Hicks | 348/745 |
| 2002/0001044 A1 | 1/2002 | Villamide | 348/745 |
| 2002/0051112 A1 | 5/2002 | Katsura | 349/153 |
| 2004/0001254 A1 | 1/2004 | Shimizu | 359/449 |

* cited by examiner

*Primary Examiner*—Sherrie Hsia
(74) *Attorney, Agent, or Firm*—Mayer & Williams PC; Stuart H. Mayer, Esq.; Kevin L. Williams, Esq.

(57) ABSTRACT

A method and apparatus for projecting an image is provided. The apparatus includes a projector operable to receive a signal representative of an image and to generate light representative of the image. A lens assembly is provided for receiving from the projector the generated light representative of the image and projecting the generated light. The generated light is projected onto a display screen so that the image is visible to a viewer. An image alignment arrangement adjusts a relative position of the image on the display screen. The image alignment arrangement, which is operable to project a test image from the projector onto the display screen, includes at least one sensor located on the display screen for detecting the test image and generating an alignment signal representative of an amount of misalignment of the test image on the display screen. The image alignment arrangement also includes a mechanical actuator for adjusting a relative position of the projector in response to the alignment signal so that the test image is properly aligned on the display screen.

33 Claims, 5 Drawing Sheets

METHOD AND APPARATUS FOR AUTOMATICALLY CORRECTING IMAGE MISALIGNMENT ARISING IN A REAR-PROJECTION LCD TELEVISION DISPLAY

BACKGROUND OF THE INVENTION

Recently, liquid crystal projectors and liquid crystal projection TVs, in which an image on a liquid crystal panel is projected onto a screen by a magnifying optical projection system utilizing a liquid crystal display (LCD) panel as an optical switching element, have been become popular. These devices are advantageous in that they are thin and lightweight, have sharp images, are not affected by earth's magnetic field, and do not require registration adjustment.

Projection televisions are known to include front and rear projection arrangements. Generally, but not exclusively, the front projection televisions are arranged to project the image on to a separate screen, whereas for rear projection televisions, the image is projected from behind a viewing side of the screen, which forms an integral part of the television.

LCD rear-projection TVs are often classified into single-panel systems composed of a liquid crystal panel having color filters for three colors, i. e., B (blue), R (red), and G (green), and three-panel systems having monochrome liquid crystal panels for the B, R, and G optical paths. According to the single-panel systems, a compact and lightweight liquid crystal device can be readily formed at a lower cost because of its simple structure. However, since the color filters absorb a large amount of light, it is difficult to achieve higher luminance and efficient cooling.

One problem that sometimes arises in LCD rear-projection TVs is that the picture appearing on the display can be misoriented and thus become distorted as a result of external mechanical influences such as shock and vibration that occurs during shipping. Such external influences can cause the optical projection unit to shift in position relative the other optical elements that are employed such as the various lens assemblies, mirrors and screen. Moreover, in addition to misorientations that arise during shipping, the correct position of the projection unit relative to these other optical elements can be difficult to achieve with complete accuracy when the TV's are manufactured in a mass-production environment.

Accordingly, it would be desirable to provide a method and apparatus for automatically correcting image misalignment that may arise in an LCD rear-projection television display.

SUMMARY OF THE INVENTION

In accordance with the present invention, a method and apparatus for projecting an image is provided. The apparatus includes a projector operable to receive a signal representative of an image and to generate light representative of the image. A lens assembly is provided for receiving from the projector the generated light representative of the image and projecting the generated light. The generated light is projected onto a display screen so that the image is visible to a viewer. An image alignment arrangement adjusts a relative position of the image on the display screen. The image alignment arrangement, which is operable to project a test image from the projector onto the display screen, includes at least one sensor located on the display screen for detecting the test image and generating an alignment signal representative of an amount of misalignment of the test image on the display screen. The image alignment arrangement also includes a mechanical actuator for adjusting a relative position of the projector in response to the alignment signal so that the test image is properly aligned on the display screen.

In accordance with one aspect of the invention, at least one mirror is provided for receiving the generated light from the lens assembly and reflecting it to the display screen.

In accordance with another aspect of the invention, the display screen includes an overscan area in which the sensor is located.

In accordance with another aspect of the invention, the test image comprises at least two lines perpendicular to one another.

In accordance with another aspect of the invention, the test image comprises a grid defined by a first series of lines that are perpendicular to a second series of lines.

In accordance with another aspect of the invention, at least a first pair of sensors detects a deviation by one of the at least two lines from a first prescribed orientation and at least a second pair of sensors detects a deviation by the other of the at least two lines from a second prescribed orientation.

In accordance with another aspect of the invention, the display screen includes an overscan area in which the first and second pairs of sensors are located.

In accordance with another aspect of the invention, the projector employs an LCD panel as an optical switching element.

In accordance with another aspect of the invention, the mechanical actuator is operable to adjust the relative position of the projector in a single dimension.

In accordance with another aspect of the invention, the mechanical actuator is operable to adjust the relative position of the projector in at least a single dimension.

In accordance with another aspect of the invention, the mechanical actuator is operable to adjust the relative position of the projector in three dimensions.

In accordance with another aspect of the invention, the mechanical actuator is further operable to rotationally adjust the relative position of the projector.

In accordance with another aspect of the invention, a method is provided for adjusting a relative position of an image on a screen of a display device. The method begins by projecting a test image from a projector onto the screen and detecting a portion of the test image on the screen. An alignment signal is generated in response to the detected portion of the test image which is representative of an amount of misalignment of the test image on the display screen. A relative position of the projector is adjusted in response to the alignment signal so that the test image is properly aligned on the screen.

DETAILED DESCRIPTION

Figure 1:
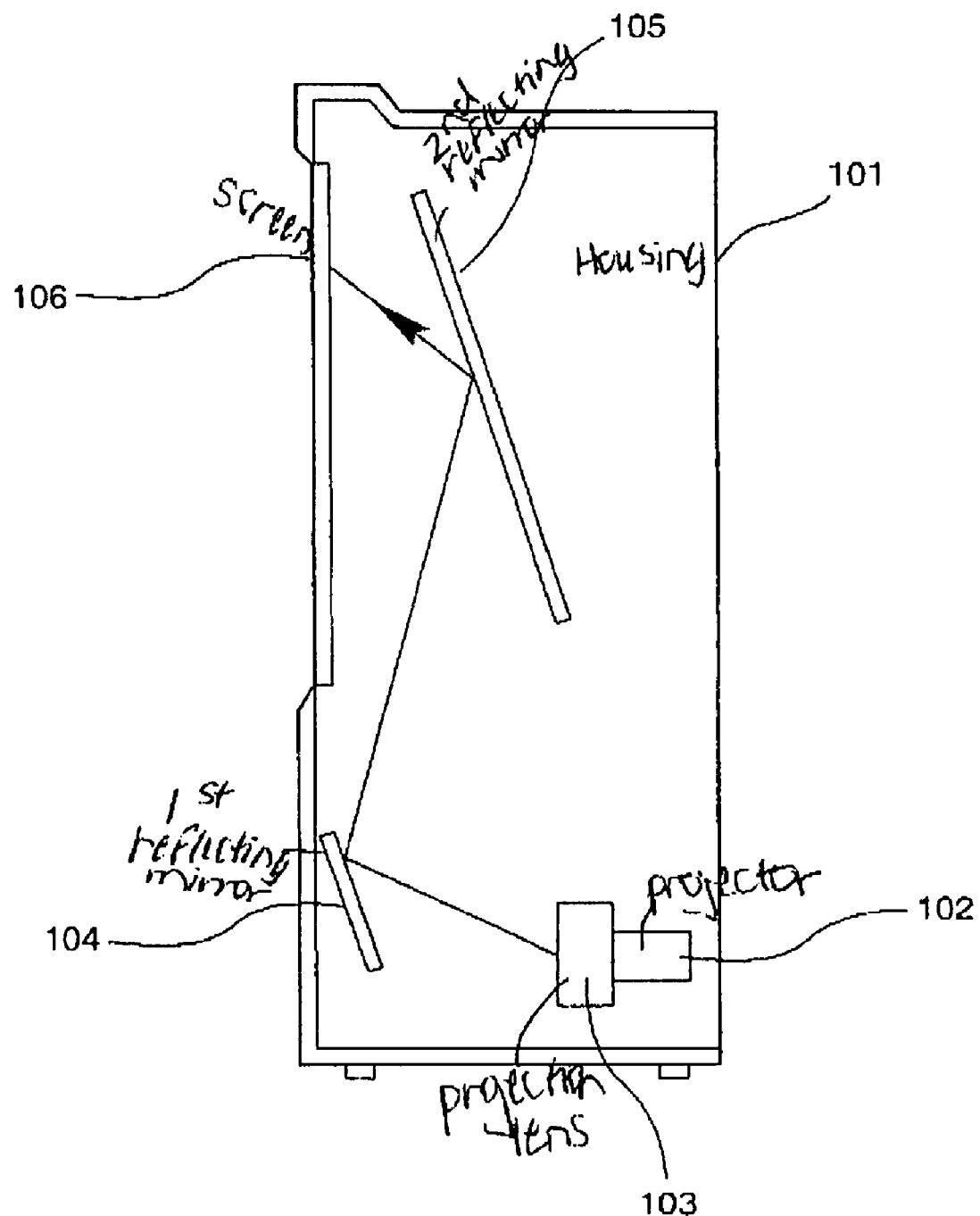
FIG. 1 is a diagram showing the schematic construction of one embodiment of an LCD rear projection television display constructed in accordance with the present invention.

FIG. 1 is a diagram showing the schematic construction of one embodiment of an LCD rear projection display. The rear projection display comprises a projector 102, a projection lens 103, a first reflecting mirror 104, a second reflecting mirror 105, a housing 101 containing the optical members, and a transmission type diffusing screen 106. Image light from the projector 102 is reflected on the reflecting mirrors 104 and 105 after traversing the projection lens 103. The image light reflected on the reflecting mirror 105 is incident on the rear surface of the screen 106, and is diffused and emitted from the front surface of the screen 106, so that a viewer can view an image on the front surface of the screen 106. In the following description, the rear surface of screen 106 onto which the image is projected will sometimes also be referred to as the projection side of the screen 106, and the front side of the screen 106 from which the image is viewed will sometimes be referred to as the viewing side of the screen 106. While the embodiment of the invention depicted in FIG. 1 employs two mirrors, those or ordinary skill in the art will recognize that the LCD rear projection display may alternatively employ only a single mirror.

Figure 2:
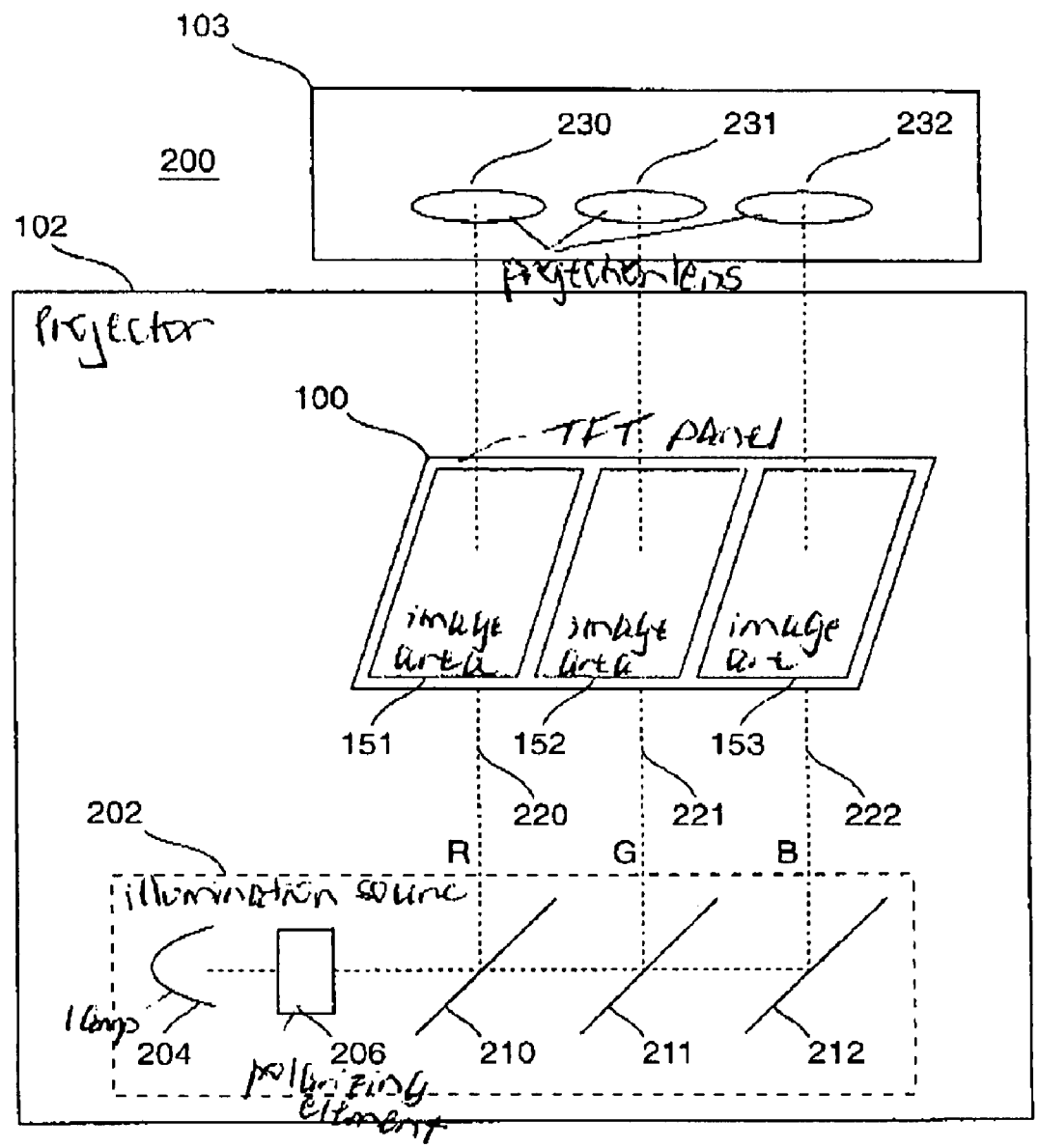
FIG. 2 is a schematic drawing of one embodiment of the projector shown in FIG. 1.

FIG. 2 is a schematic drawing of one embodiment of the projector 102 shown in FIG. 1 illustrating the basic components and the basic operation of the projection system. While for purposes of illustration only FIG. 2 depicts a projector that employs three monochrome liquid crystal panels for the B, R and G optical paths, those of ordinary skill in the art will recognize that the invention is equally applicable to other LCD rear projection displays such as those that employ a liquid crystal panel having color filters for the three colors.

Referring to FIG. 2, projector 102 includes an illumination source 202 providing a source of polarized color light beams, a monochrome TFT LCD panel 100 and a projection lens assembly including projection lenses 230, 231 and 232.

Illumination source 202 may be configured in one of many ways known in the art to provide polarized and color-filtered light beams. In general, illumination source 202 includes a light source, a polarizing element and a color separating element for separating light into the primary colors. Illumination source 202 operates to generate polarized light beams in the primary colors. For example, in the present embodiment, polarized light beams 220, 221, 222 in the red, green and blue colors, respectively, are generated by illumination source 202. In the present description, the exemplary primary color system used is the RGB (red, green, blue) color system, which is most commonly used in conventional projection systems.

Illumination source 202 includes a lamp 204 supplying a source of randomly polarized white light for the projection system. Illumination source 202 also includes a polarizing element 206 for polarizing the randomly polarized white light emitted by lamp 204. Lastly, illumination source 202 includes a red color dichroic mirror 210, a green color dichroic mirror 211 and a mirror 212 as the color separating elements. Polarized light from polarizing element 206 is separated into red, green, and blue light beams by the dichroic mirrors 210, 211. In operation, the first dichroic mirror 210 reflects red light while transmitting green and blue light. Thus, a polarized light beam 220 in the red color is generated and reflected towards TFT panel 100. The second dichroic mirror 211 reflects green light while transmitting the remaining blue light. Thus, a polarized light beam 221 in the green color is generated and reflected towards TFT panel 100. Finally, the remaining blue light is reflected by the third mirror 212 to form polarized light beam 222, and is directed towards TFT panel 100. As shown in FIG. 2, the polarized color light beams 220, 221 and 222 are each directed to a respective image area in TFT panel 100, as will be explained in more detail below.

The embodiment of illumination source 202 shown in FIG. 2 is illustrative only and one of ordinary skill in the art would appreciate that many configurations of light source, polarizing element and color separating elements are possible for generating polarized light beams in the primary colors. For example, mirrors 210, 211, and 212 can be placed in different positions depending on the position of TFT panel 100 and the position of lamp 204 within the projection system. Other arrangements for color separating elements are possible, such as the use of color separating prisms, color filters, other dichroic surfaces. While the embodiment of illumination source 202 shown in FIG. 2 achieves efficiency by using a single light source and separating the single light source into the primary color components so that no light is wasted, other embodiments of illumination source 202 may include multiple light sources (lamps) if efficiency and power consumption is not of primary concern. For instance, in another embodiment, illumination source 202 includes three lamps, three polarizing elements and three color filters in the red, green and blue colors. Each lamp/polarizing element/color filter group generates a polarized light beam in one primary color directed at the respective image area of TFT panel 100.

In one embodiment of the invention, monochrome TFT LCD panel (TFT panel) 100 is an active matrix monochrome TFT panel. TFT panel 100 includes liquid crystal material and electrodes sandwiched between transparent glass plates. TFT panel 100 also includes an input polarizer and an output polarizer. TFT panel 100 is controlled by electronics (not shown) that control the electrodes on the panel, each electrode forming a pixel of TFT panel 100. The electrodes operate to apply voltages to the liquid crystal molecules in accordance with the image data provided by the control electronics. The liquid crystal molecules in turn modulate the incoming polarized light beams in accordance with the image data.

The two dimensional array of addressable pixels of TFT panel 100 are divided into three separate image areas 151, 152, and 153. Each image area of TFT panel 100 receives image data information for creating an image in the primary color component designated for that image area. For example, image area 151 is designated to create an image in the red color component, image area 152 is designated to create an image in the green color component, and image area 153 is designated to create an image in the blue color component. In accordance with the present invention, the separate images representing the primary color components of a color image are created by transmitting colored light through separate image areas of a monochrome LCD panel. Each image area receives image data information associated with the primary color component designated for that image area. The image data information can be provided via the control electronics of TFT panel 100. Each image area modulates the polarized color light designated for that image area to create the desired image in the primary color component.

Referring to FIG. 2, polarized light beams 220, 221 and 222 in red, green and blue colors are directed to their respective image areas 151, 152 and 153 of TFT panel 100. Red image area 151 of TFT panel 100 modulates incident red light beam 220 according to red image data to form the red portion of the full color image. Similarly, green area 152 and blue area 153 of TFT panel 100 modulate green light beam 221 and blue light beam 222 according to the green and blue image data respectively.

After TFT panel 100 modulates light beams 220, 221, and 222, the modulated light beams exiting projector 102 are directed towards a projection lens assembly 103, which includes projection lenses 230, 231 and 232. Finally, referring again to FIG. 1, the light beams are reflected by mirrors 104 and 105 on the rear surface of the screen 106.

Figure 3:
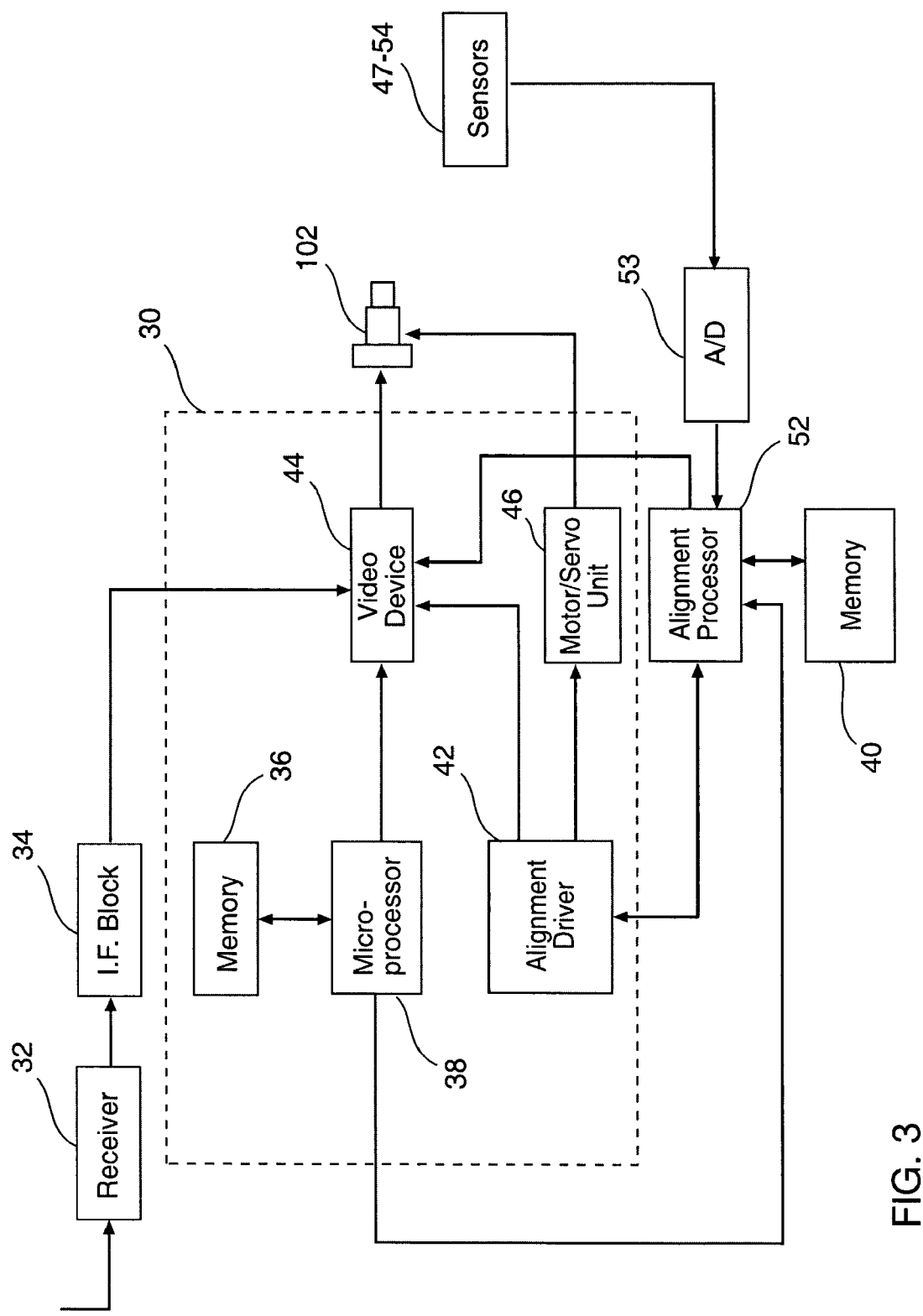
FIG. 3 shows a functional block diagram of one embodiment of the television display with an image alignment arrangement constructed in accordance with the present invention.

FIG. 3 shows a functional block diagram of one embodiment of the image alignment arrangement constructed in accordance with the present invention. In FIG. 3, a projection processor 30 receives an image signal I from an image source such as a television receiver 32. The image signal I is fed to a video device 44 that separates the image signal into the component signals $I_R$, $I_B$, $I_G$, which are applied to the projector 102. The projection processor 30 has a system controller 38 formed from a microprocessor. The system controller 38 has an associated memory 36 for storing program instructions and data. The projection processor 30 also includes alignment driver 42 for controlling the spatial alignment of projector 102, in combination with an alignment processor 52. The alignment processor 52 has an associated memory 40 for storing one or more algorithms that is used during the alignment process. A motor/servo unit 46, which is controlled by the alignment driver 42, mechanically adjusts the position and orientation of the projector 102 to achieve the proper spatial alignment.

Figure 4:
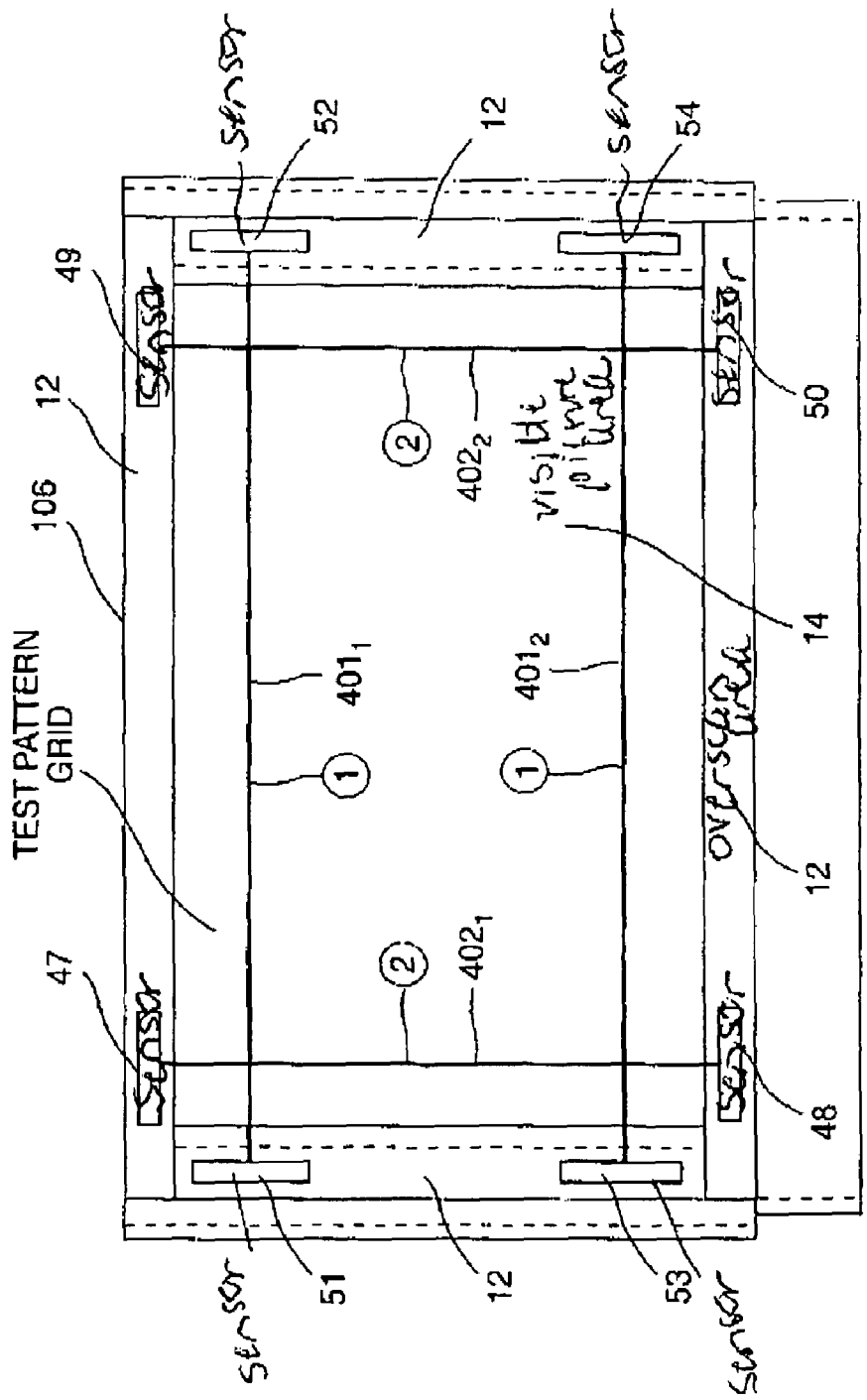
FIGS. 4 and 5 show the sensors and the test projection on the screen of the television display in FIG. 1

The image alignment arrangement also employs two or more sensors such as sensors 47-54. The sensors 47-54 are typically photocells and are arranged at the periphery of the projection side of screen 106 as illustrated in FIG. 4. Those of ordinary skill in the art will recognize that while images are generally projected to fill the screen 106, the screen typically includes an over-scan area 12 which is opaque and therefore obscures a part of the image projected in this area from the viewing side. The remainder of the image may be viewed in a visible picture area 14. It is well know to provide the overscan area 12 in order to prevent the user from viewing any blanking regions formed in the scanned image that may become visible as a result of image drift.

In one embodiment of the invention, the sensors 47-54 are disposed in the overscan area 12. For example, in the particular embodiment of the invention shown in FIG. 4, sensors 47 and 48 are located vertically over one another in the overscan area 12, and sensor 49 and 50 are vertically located over one another in the overscan area 12. Similarly, sensors 51 and 52 are located along a common horizontal line in overscan area 12 and sensors 53 and 54 are located along another common horizontal line in overscan area 12. However, it will be appreciated that the sensors may be positioned at any suitable point within the overscan area 12. The sensors 47-54 may be any appropriate devices such as photodiodes or phototransistors which generate a photovoltaic response at each of the wavelengths of the components $I_R$, $I_G$, and $I_B$. Photodiodes are one example of a group of sensors having a narrow field of view, such that only light which is in close proximity to the photodiode will result in an output measurement signal being generated. Furthermore the sensors preferably have a sufficient response time to ensure that the rise and decay of the output signal has a minimal lag with respect to the incident light and that the output signal is proportional to the flux levels of the incident light.

It will be understood that the function of the various components of the alignment apparatus shown in FIG. 3 may be carried out using hardware, software, firmware, or any combination thereof. That is, the particular functional elements set forth in FIG. 3 are shown for purposes of clarity only and do not necessarily correspond to discrete physical elements.

The operation of the image alignment arrangement depicted in FIG. 3 is as follows. After a manual activation of a reset switch (not shown) by the user, the system controller 38 instructs the alignment processor 52 to enter an automatic alignment process. During the automatic alignment process the image signal is isolated by the video device 44, such that only a test signal representative of a test projection is applied to the projector 102. Hence whilst the test projection is being projected the projected television image cannot be seen. As shown in FIGS. 4, in one embodiment of the invention the test projection comprises orthogonal grid lines such as the first pair of lines $401_1$ and $401_2$ and a second pair of lines $402_1$ and $402_2$. The test projection is arranged so that the generally vertically oriented line $402_1$ traverses sensors 47 and 48 and generally vertically oriented line $402_2$ traverses sensors 49 and 50. Likewise, generally horizontally oriented line $401_1$ traverses sensors 51 and 52 and generally horizontally oriented line $401_2$ traverses sensors 53 and 54. When the projector 102 is properly positioned in the housing 101, lines $402_1$ and $402_2$ will extend precisely in the vertical direction and lines $401_1$ and $401_2$ will extend precisely in the horizontal direction. However, when as in FIG. 5 the projector 102 is misaligned, the lines will deviate from the horizontal and vertical by an amount that can be determined by the sensors 47-54.

Figure 5:
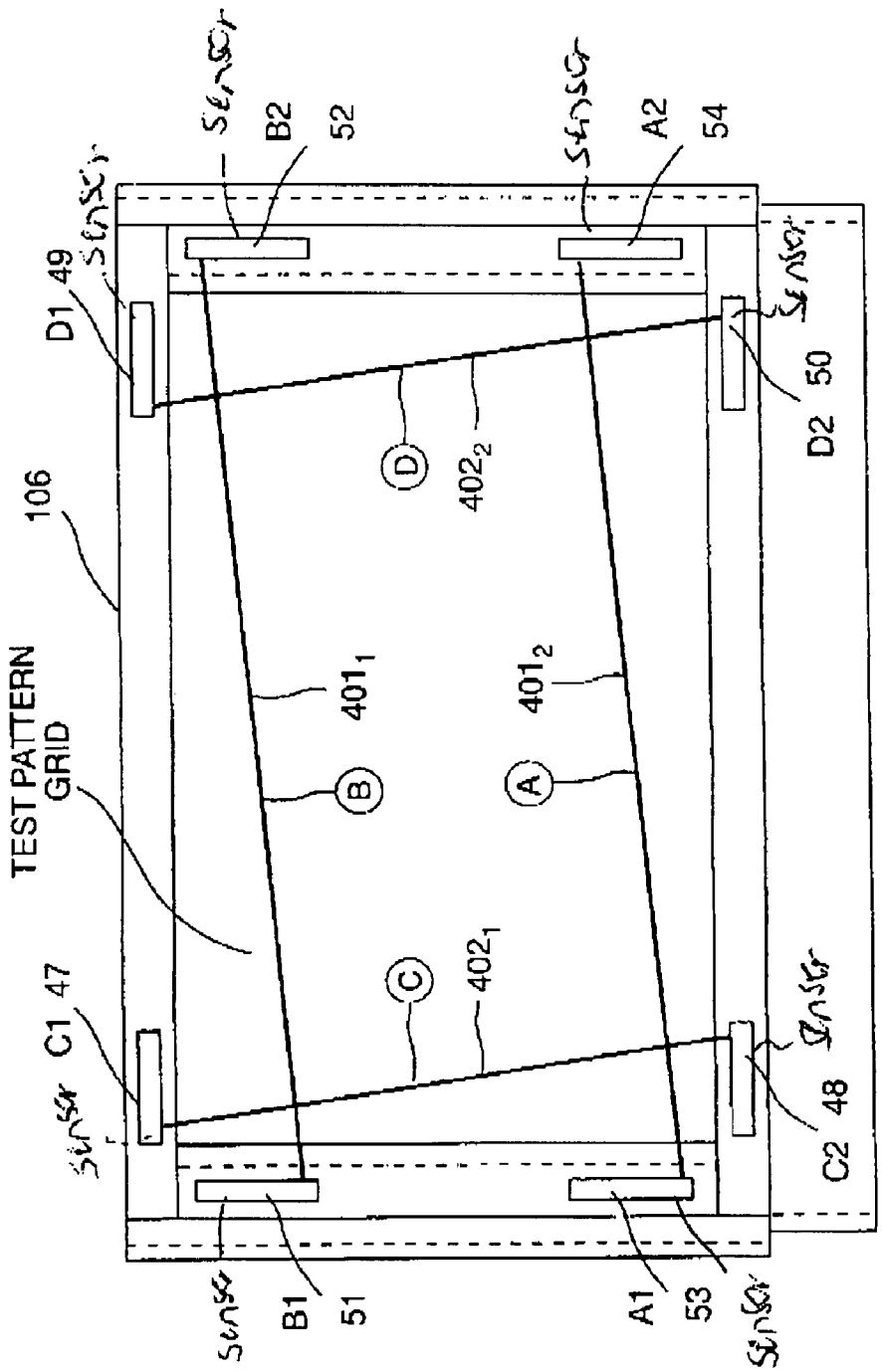
Figure 1:
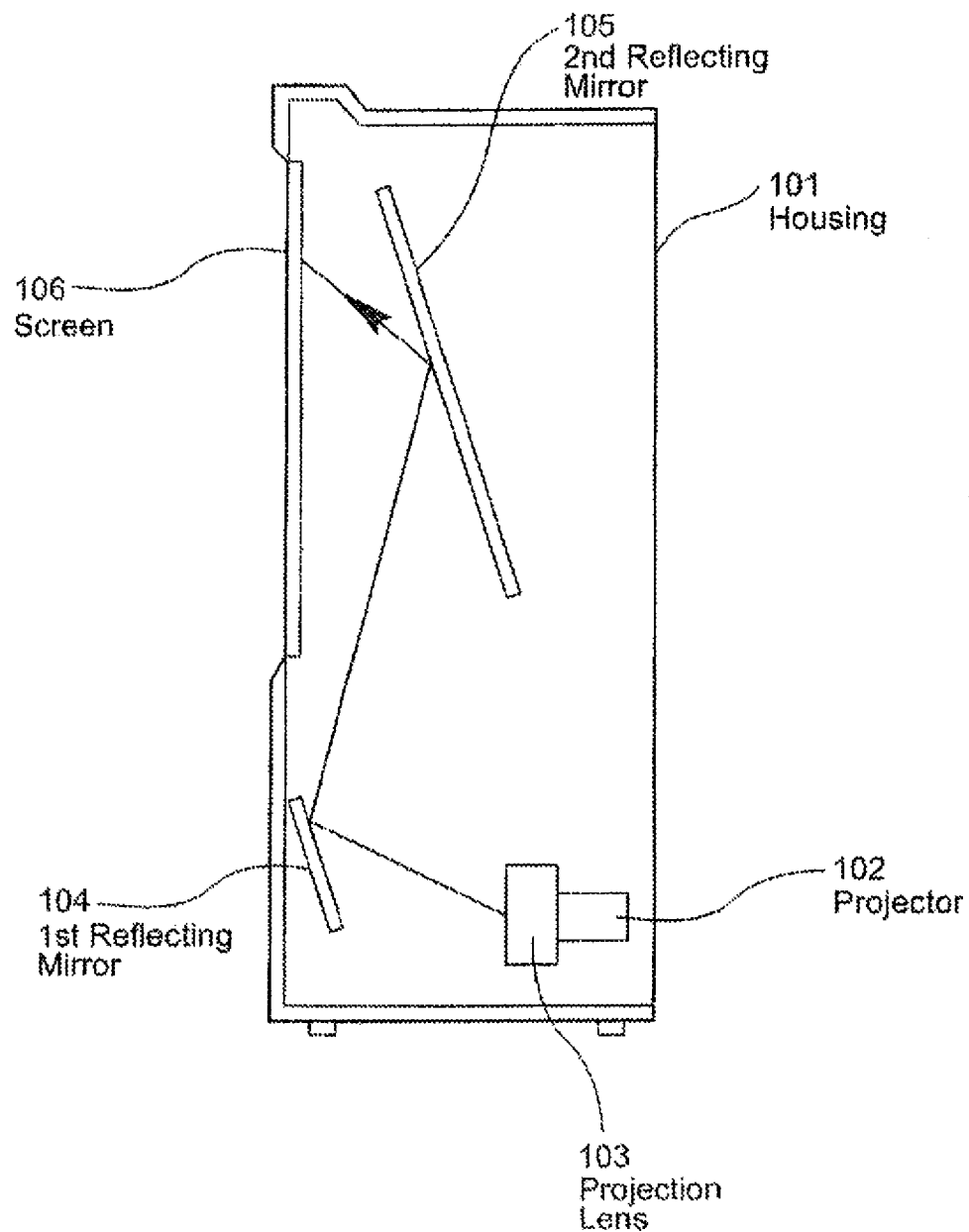
Figure 2:
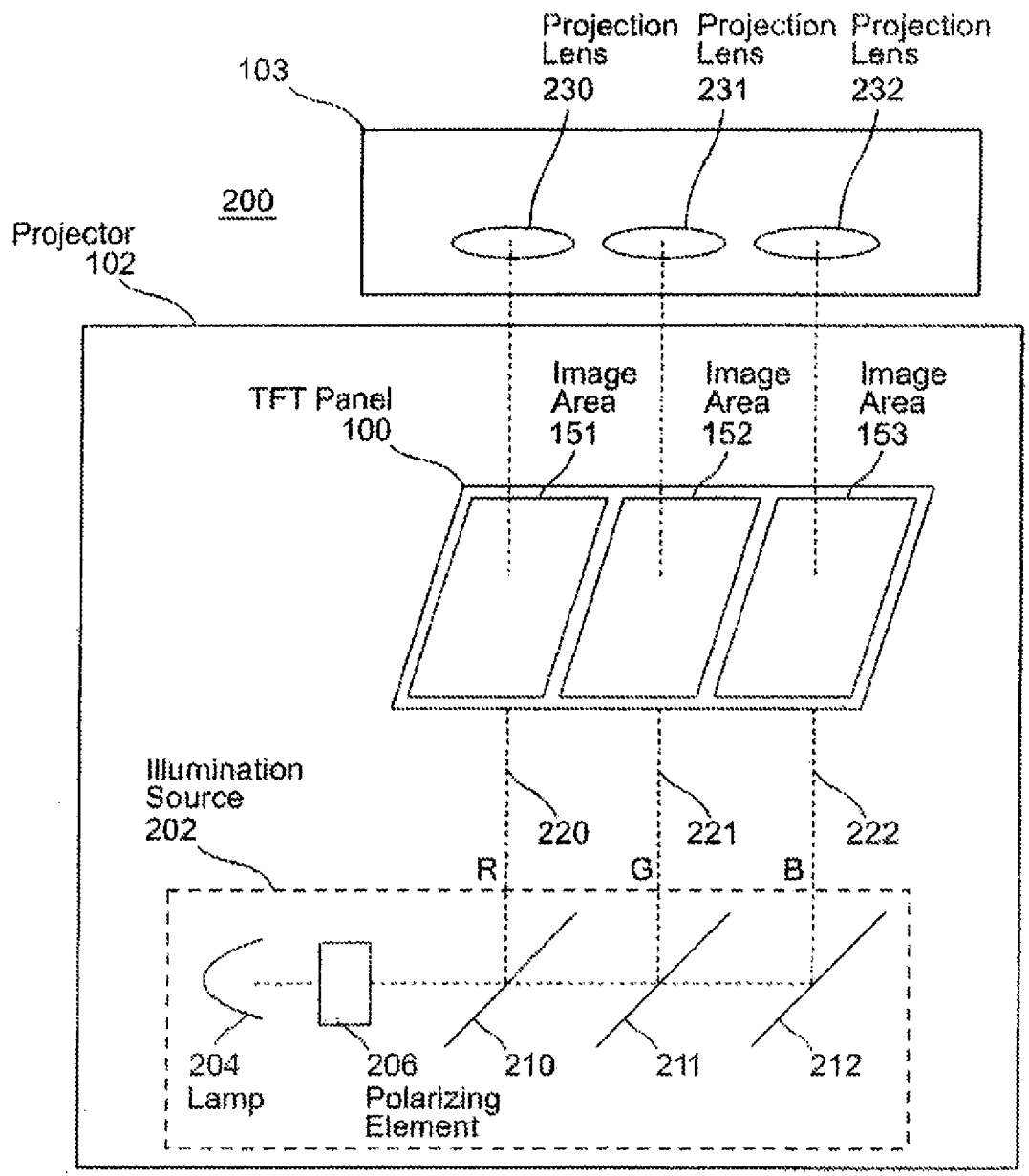
Figure 4:
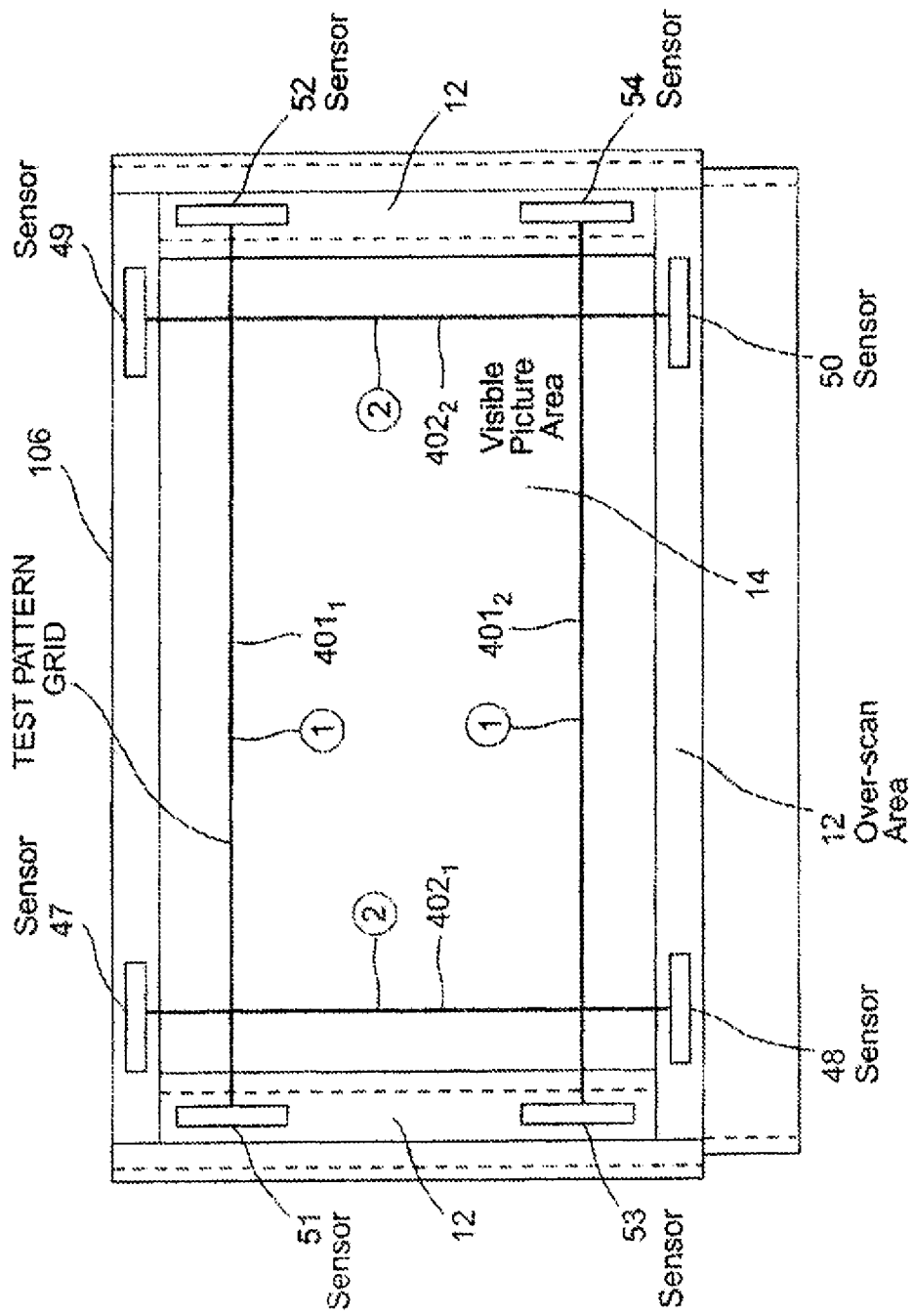
Figure 5:
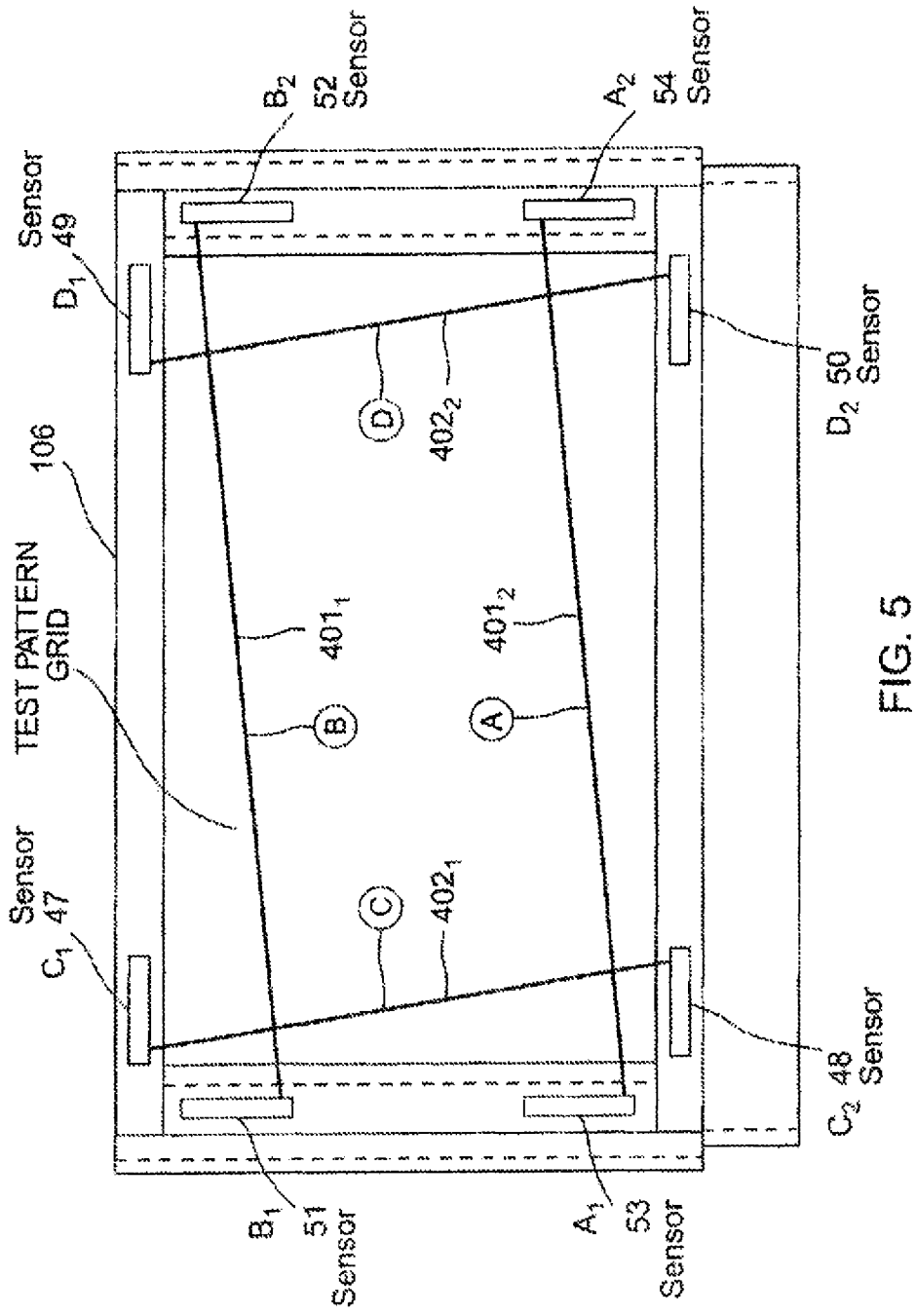

The sensors each record the location (relative to an arbitrary reference point) of the test projection line that respectively traverses them. For example, as shown in FIG. 5, sensors 47 and 48 record the locations C1 and C2, respectively, traversed by line $402_1$ and sensors 49 and 50 record the locations D1 and D2, respectively, traversed by line $402_2$. The horizontal misalignment of the test projection is numerically equal to the horizontal offset between C2 and C1 and the horizontal offset between D2 and D1. Proper horizontal alignment is achieved when the horizontal offset C2-C1 and D2-D1 are substantially equal to zero. Similarly, sensors 51 and 52 record the locations B1 and B2, respectively, traversed by line $401_1$ and sensors 53 and 54 record the locations A1 and A2, respectively, traversed by line $401_2$. The vertical misalignment of the test projection is numerically equal to the vertical offset between B2 and B1 and the vertical offset between A2 and A1. Proper vertical alignment is achieved when the vertical offsets B2-B1 and A2-A1 are substantially equal to zero.

Referring again to FIG. 3, the measurement signals denoting locations A1, A2, B1, B2, C1, C2, D1, and D2 from the sensors 47-54 are received by the alignment processor 52 via an A/D converter 53. The alignment processor 52 then computes each of the vertical and horizontal offsets. Based on these offsets, the alignment processor 52 calculates the adjustment in the position of the projector 102 that is needed to reduce the offsets to zero. The calculation may be performed by an algorithm stored in the memory 40 associated with alignment processor 52. The alignment processor 52 then generates an adjustment signal that is applied to the motor/servo unit 46 via the alignment driver 42. The motor/servo unit 46 adjusts the position and orientation of the projector 102 in a known manner using mechanical positioning technology. For example, a motor may turn an adjustment screw or other linear or rotational actuator that mechanically moves the projector 102. The algorithm that is used to determine the adjustment to be made by the motor/servo unit to the position of the projector 102 may be obtained through experimental testing and may allow the position of the projector 102 to be adjusted in one or more directions, and preferably in all three directions. The algorithm may also allow the rotational position of the projector 102 to be adjusted. If the adjustment is to occur in 2 or more directions, the motor/servo unit 46 may advantageously employ 2 or more actuators to enhance the accuracy of the image alignment arrangement.

The locations of the test projection lines may continue to be monitored by the sensors 47-54 while the motor/servo unit 46 is adjusting the position and orientation of the projector 102. In this way adjustment can be stopped when the projector 102 is properly oriented by reducing the offsets to zero. Once the offset have been reduced to zero, the alignment process is terminated and the projected image according to the television signal is again displayed.

As previously mentioned, the present invention may employ any number of sensors and Is not limited to the eight sensors 47-54 that are depicted in the figures. More generally, the number of sensors that are employed, in combination with any particular test projection, should be sufficient to detect misalignment of the image on the screen and to provide the necessary information to cause the image to be properly realigned.

Although various embodiments are specifically illustrated and described herein, It will be appreciated that modifications and variations of the present invention are covered by the above teachings and are within the purview of the appended claims without departing from the spirit and intended scope of the invention. For example, while the motor/servo unit 46 has been described as adjusting the relative position of the projector to align the image, the motor/servo unit 46 can alternatively, or in addition to, adjust the relative position of the projection lens 103 and/or the mirrors 104 and 105.

The invention claimed is:

1. An apparatus for projecting an image, comprising:
  a projector operable to receive a signal representative of an image and to generate light representative of the image;
  a lens assembly for receiving from the projector the generated light representative of the image and projecting said generated light;
  a display screen onto which the generated light is projected so that the image is visible to a viewer;
  an image alignment arrangement for adjusting a relative position of the image on the display screen, said image alignment arrangement being operable to project a test image from the projector onto the display screen and including:
  at least one sensor located on the display screen for detecting the test image and generating an alignment signal representative of an amount of misalignment of the test image on the display screen; and
  a mechanical actuator for adjusting a relative position of the projector in response to said alignment signal so that the test image is properly aligned on the display screen.

2. The apparatus of claim 1 further comprising at least one mirror receiving the generated light from the lens assembly and reflecting it to the display screen.

3. The apparatus of claim 1 wherein said display screen includes an overscan area in which said at least one sensor is located.

4. The apparatus of claim 1 wherein said test image comprises at least two lines perpendicular to one another.

5. The apparatus of claim 1 wherein said test image comprises a grid defined by a first series of lines that are perpendicular to a second series of lines.

6. The apparatus of claim 5 further comprising at least a first pair of sensors detecting a deviation by one of the at least two lines from a first prescribed orientation and at least a second pair of sensors detecting a deviation by the other of the at least two lines from a second prescribed orientation.

7. The apparatus of claim 6 wherein said display screen includes an overscan area in which said first and second pairs of sensors are located.

8. The apparatus of claim 1 wherein said projector employs an LCD panel as an optical switching element.

9. The apparatus of claim 1 wherein said mechanical actuator is operable to adjust the relative position of the projector in a single dimension.

10. The apparatus of claim 1 wherein said mechanical actuator is operable to adjust the relative position of the projector in at least a single dimension.

11. The apparatus of claim 10 wherein said mechanical actuator is operable to adjust the relative position of the projector in three dimensions.

12. The apparatus of claim 11 wherein said mechanical actuator is further operable to rotationally adjust the relative position of the projector.

13. A method for adjusting a relative position of an image on a screen of a display device, said method comprising the steps of:
  projecting a test image from a projector onto the screen;
  detecting a portion of the test image on the screen;
  generating, in response to the detected portion of the lest image, an alignment signal representative of an amount of misalignment of the test image on the display screen; and
  adjusting a relative position of the projector in response to said alignment signal so that the test image is properly aligned on the screen,
  wherein the relative position of projector is adjusted by rotation of the projector.

14. The method of claim 13 further comprising the step of reflecting the test image received from the projector onto the screen.

15. The method of claim 13 wherein the detecting step is performed in an overscan area of the screen.

16. The method of claim 13 wherein said test image comprises at least two lines perpendicular to one another.

17. The method of claim 13 wherein said test image comprises a grid defined by a first series of lines that are perpendicular to a second series of lines.

18. The method of claim 17 wherein the detecting step is performed by at least a first pair of sensors detecting a deviation by one of the at least two lines from a first prescribed orientation and at least a second pair of sensors detecting a deviation by the other of the at least two lines from a second prescribed orientation.

19. The method of claim 18 wherein said screen includes an overscan area in said first and second pairs of sensors are located.

20. The method or claim 13 wherein said projector employs an LCD panel as an optical switching element.

21. The method of claim 13 wherein the relative position of the projector is adjusted in at least one dimension.

22. The method of claim 21 wherein the relative position of the projector is adjusted in three dimensions.

23. A rear-projection television, comprising:
  a projector operable to receive a signal representative of an image and to generate light representative of the image;
  a lens assembly for receiving from the projector the generated light representative of the image and projecting said generated light;
  at least one mirror receiving the generated light from the lens assembly and reflecting it to the display screen;
  a display screen onto which the generated light is projected so that the image is visible to a viewer,
  an image alignment arrangement for adjusting a relative position of the image on the display screen, said image alignment arrangement being operable to project a test image from the projector onto the display screen and including:

at least one sensor located on the display screen for detecting the test image and generating an alignment signal representative of an amount of misalignment of the test image on the display screen; and a mechanical actuator for adjusting, in response to said alignment signal, a relative position of at least one component selected from the group consisting of the projector, the lens assembly, and said at least one mirror so that the test image is properly aligned on the display screen.

24. The rear-projection television of claim 23 wherein said display screen includes an overscan area in which said at least one sensor is located.

25. The rear-projection television of claim 23 wherein said test image comprises at least two lines perpendicular to one another.

26. The rear-projection television of claim 23 wherein said test image comprises a grid defined by a first series of lines that are perpendicular to a second series of lines.

27. The rear-projection television of claim 26 further comprising at least a first pair of sensors detecting a deviation by one of the at least two lines from a first prescribed orientation and at least a second pair of sensors detecting a deviation by the other of the at least two lines from a second prescribed orientation.

28. The rear-projection television of claim 27 wherein said display screen includes an overscan area in which said first and second pairs of sensors are located.

29. The rear-projection television of claim 23 wherein said projector employs an LCD panel as an optical switching element.

30. The rear-projection television of claim 23 wherein said mechanical actuator is operable to adjust the relative position of the projector in a single dimension.

31. The rear-projection television of claim 23 wherein said mechanical actuator is operable to adjust the relative position of the projector in at least a single dimension.

32. The rear-projection television of claim 31 wherein said mechanical actuator is operable to adjust the relative position of the projector in three dimensions.

33. The rear-projection television of claim 32 wherein said mechanical actuator is further operable to rotationally adjust the relative position of the projector.

* * * * *

UNITED STATES PATENT AND TRADEMARK OFFICE
CERTIFICATE OF CORRECTION

PATENT NO. : 7,460,185 B2
APPLICATION NO. : 10/919741
DATED : December 2, 2008
INVENTOR(S) : Saletta It is certified that error appears in the above-identified patent and that said Letters Patent is hereby corrected as shown below:

In the Drawings

The drawing sheets 1, 2, 4 and 5 consisting of Fig(s) 1-2 and 4-5 should be deleted and substitute therefore the attached drawing sheets 1, 2, 4 and 5 consisting of Fig(s) 1-2 and 4-5.

Specification, Col. 1, line 13, after "have", delete "been".

Specification, Col. 1, line 38, after "relative", insert --to--.

Specification, Col. 3, line 17, before "ordinary", change "or" to --of--.

Specification, Col. 5, line 31, after "well", change "know" to --known--.

Specification, Col. 5, line 39, after "and" (first occurrence), change "sensor" to --sensors--.

Specification, Col. 7, line 4, change "offset" to --offsets--.

Specification, Col. 7, line 8, after "and", change "Is" to --is--.

Specification, Col. 7, line 16, after "herein,", change "It" to --it--.

Claim 13, Col. 8, line 18, after "the" (second occurrence), change "lest" to --test--.

Claim 19, Col. 8, line 44, after "in", insert --which--.

UNITED STATES PATENT AND TRADEMARK OFFICE
CERTIFICATE OF CORRECTION

PATENT NO.          : 7,460,185 B2
APPLICATION NO. : 10/919741
DATED                  : December 2, 2008
INVENTOR(S)        : Saletta It is certified that error appears in the above-identified patent and that said Letters Patent is hereby corrected as shown below:

Claim 20, Col. 8, line 44, after "method", change "or" to --of--.

Signed and Sealed this

First Day of December, 2009

David J. Kappos
*Director of the United States Patent and Trademark Office*